United States Patent [19]
Fernandes

[11] 3,862,549
[45] Jan. 28, 1975

[54] MODULAR ENVIRONMENTAL CONTROL SYSTEM

[75] Inventor: Joseph F. Fernandes, Dayton, Ohio

[73] Assignee: United Aircraft Products, Inc., Dayton, Ohio

[22] Filed: Nov. 29, 1972

[21] Appl. No.: 310,666

[52] U.S. Cl. .................................. 62/419, 165/42
[51] Int. Cl. ............................................ B60h 3/00
[58] Field of Search ..................... 165/23, 42–44, 165/62, 98; 62/302, 405, 419

[56] References Cited
UNITED STATES PATENTS

| | | | |
|---|---|---|---|
| 2,675,998 | 4/1954 | Reynolds | 165/42 |
| 2,694,553 | 11/1954 | Hicke et al. | 165/43 |
| 2,968,933 | 1/1961 | Pfeifer et al. | 62/419 |

Primary Examiner—Charles Sukalo
Attorney, Agent, or Firm—J. E. Beringer

[57] ABSTRACT

An environmental control system the components of which are in a self contained unitary package, particularly adapted for modular installation in railway, buses and like transport vehicles. Refrigeration components including refrigerant flow lines are internal to a module which is adapted for simplified mounting in and removal from the vehicle. Interfacial relationships with conditioned air ducting systems and with ambient air flowing systems in the vehicle are inherently arrived at. Heating means integrated into the module gives the system multiple mode capabilities including cooling, dehumidification, cooling with reheat, heating and ventilation.

10 Claims, 4 Drawing Figures

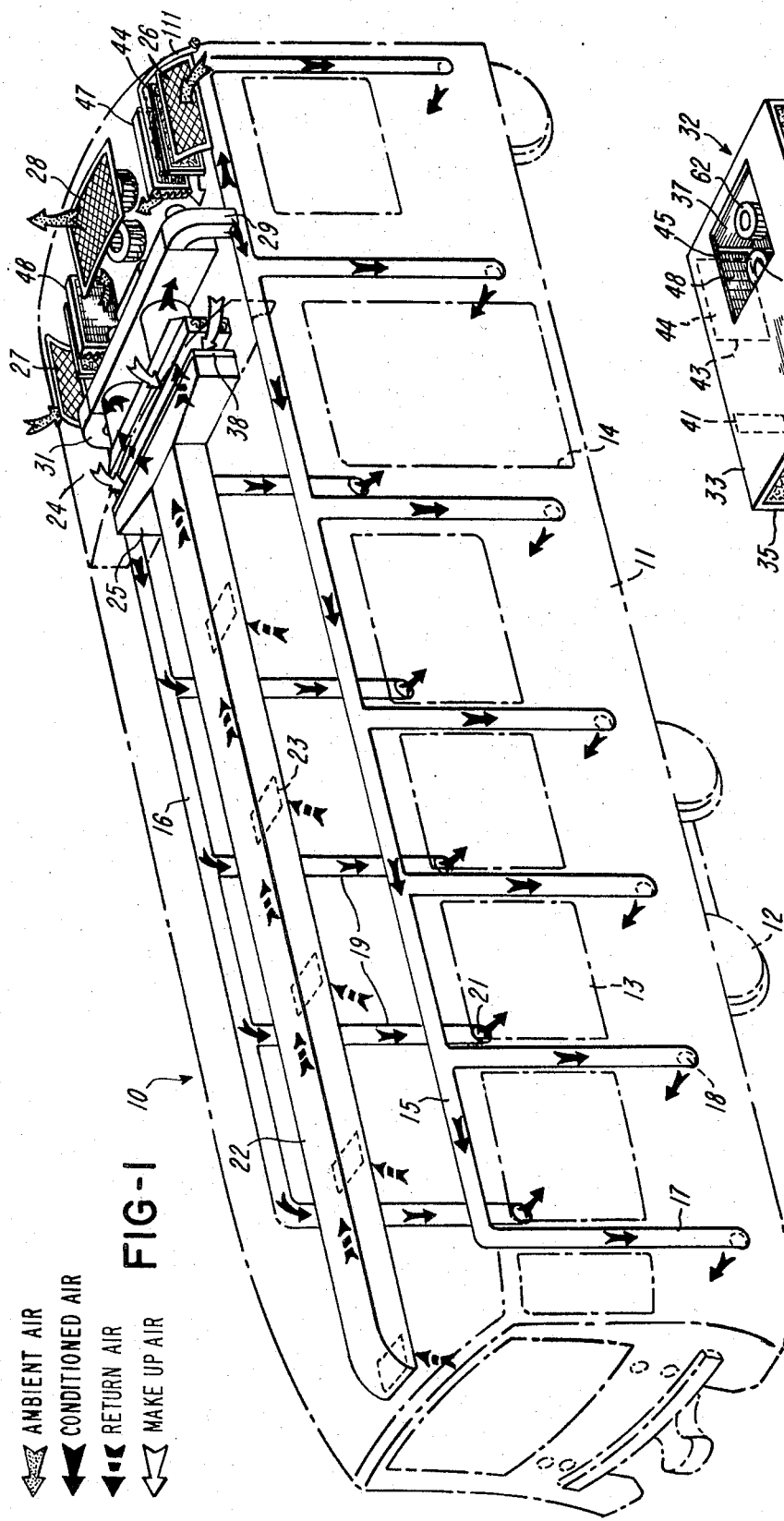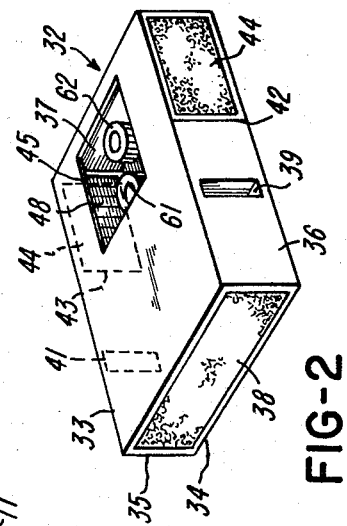

MODULAR ENVIRONMENTAL CONTROL SYSTEM

BACKGROUND OF THE INVENTION

Concepts of public transportation, especially in and around large cities, currently envision a use of mass transport vehicles with particular emphasis on rail vehicles. Programs in progress or proposed have in view new designs, utilizing advances in materials, processes and equipment designed to make the vehicles compact, light in weight and easy to service and maintain. Due in part to the constraints imposed by such designs, and in other part to the comfort requirements of a now more sophisticated traveling public, it is regarded as necessary to incorporate into the new transport vehicles environmental control systems having various cooling, heating and ventilating modes of operation. There has not, however, heretofore been available environmental support apparatus complementary to compact, light weight structures otherwise characterizing the new vehicles. Transport vehicles of the prior art accordingly have a hybrid quality in that they combine advanced structural and control concepts with old forms of heating and cooling systems. Thus, components of a refrigeration system are variously disposed about the vehicle, including underslung locations, and connected by exposed refrigerant flow lines. Heating is accomplished by a parallel, independent system, or by separate radiant heating means. The prior art systems are thus subject to damage, are not readily serviced and are generally incompatible with other aspects of a modern rapid transit vehicle. Through an absence of adequate air filtering dirt streaking around air grills frequently is evident. Old environmental control systems have a further disadvantage, namely excess weight, which becomes increasingly evident and objectionable as efforts are made to reduce the overall weight of the vehicle. Calculations show a direct and corresponding relationship between weight and operating costs allowing a specific projected saving over a period of time for each pound which it is possible to eliminate from the vehicle design.

SUMMARY OF THE INVENTION

The instant invention contemplates an environmental control system, for rail transport vehicles and the like, having as it heart a module incorporating cooling and heating means and capable of being installed in and removed from the vehicle as a self contained unit. According to one invention aspect the vehicle presents a module receiving area providing for an interface of a module with flow ducts for conditioned air and passageway means for an ambient cooling air. Still further in accordance with such aspect the module receiving area is located to be conveniently accessible, as for example in an overhead relation but substantially within outline dimensions of the vehicle. Within the module, concepts of compact, high density heat exchangers and of compact full flow air movers reduce volume and weight and result in a control system module occupying a relatively small space and relatively easily handled for installation and replacement. A complete environmental control system is comprised in a single module. Failure of a system component can be dealt with by replacing one module with another, the defective module being removed for convenient inspection and repair. The taking of a vehicle out of service will ordinarily be unnecessary or will be for minimal periods of time.

It is accordingly an object of the invention to introduce a concept of environmental control in rail and other transport vehicles featuring use of a self contained, compact and light weight module incorporating an environmental control system.

Other objects and structural details of the invention will appear from the following description when read in connection with the accompanying drawings, wherein:

FIG. 1 is a view in perspective of a public transportation rail vehicle incorporating an environmental control system in accordance with one illustrated embodiment of the present invention, portions being broken away to show module components and a showing of interconnecting portions of the refrigeration system being omitted;

FIG. 2 is a view in perspective of a module according to the illustrated embodiment of FIG. 1;

Figure 3:
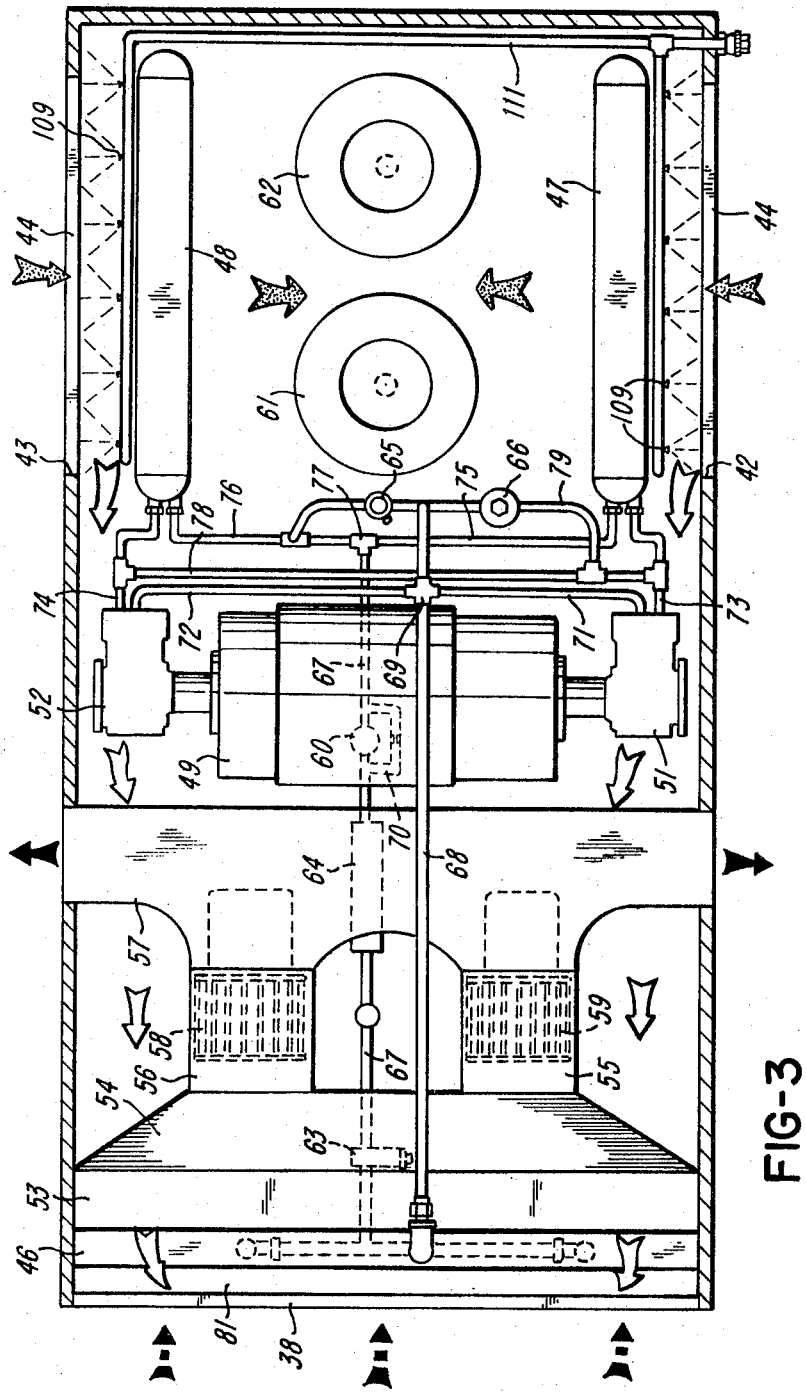
FIG. 3 is a diagram of the control system of FIGS. 1 and 2.

Referring to FIGS. 1, 2 and 3, in accordance with this illustrated embodiment, a rail type vehicle 10, which for convenience will hereinafter be identified as a "car," has a body 11 mounted on wheels 12 and in which are spaced apart windows 13 and a door 14. The car is of a type presently being designed for use in urban and interurban rapid transit systems. The window and door pattern viewed is or may be repeated on the opposite side. At one end of the car is a compartment for an operator, which may or may not be occupied, the car being useful alone or in multiple unit form and in some instances responding to automated controls. An environmental control system may be regulated from the operator's compartment, or may be fully automatic, shifting from heating, cooling and ventilating modes in response to changes in sensed temperatures.

The conditioned air distribution system may take various forms. In the illustrated instance it includes closed ducts 15 and 16 running lengthwise of the car in upper sidewalls thereof. A longitudinal series of vertically disposing passageways 17 are in one side wall of the car, located between adjacent windows 13 and between the windows and door 14. At their upper ends the passageways 17 communicate with duct 15. At their lower ends, or intermediate their ends, or both, the passageways have an aperture or apertures 18 opening through the car wall into the car interior. A like series of passageways 19 having lower discharge apertures 21 are located in the opposite car wall. Conditioned air under pressure which may be admitted to the ducts 15 and 16 accordingly is distributed substantially throughout the car interior by way of the several downwardly directed passageways 17 and 19 and their discharge apertures 18 and 21.

Recessed into the ceiling of the car and extending longitudinally thereof is a duct 22. Longitudinally spaced apart openings 23 communicate the duct 22 with the car interior. The openings 23 and communicating duct 22 provide a route of flow for return air, that is, conditioned air which has been circulated within the car and is being returned for reconditioning. At its one end the duct 22 is suitably closed. At its opposite end the duct opens into a module receiving area 24 formed integrally with the car in an upper portion thereof and contained within the outline dimensions of the car. Area 24 is generally open and is provided at one end with a transversely disposing manifold 25 into which the open end of duct 22 extends. Toward the opposite end of chamber 24, apertures in the roof line of the car have side screens 26 and 27 installed therein as well as an overhead screen 28. Through the several screens 26, 27 and 28, the area 24 communicates with ambient surroundings. All screens, as indicated, dispose substantially perpendicular to the direction of car movement so that they do not project into the path of flow of air moving over the car and so are unlikely to be damaged or to ice over. In an intermediate portion, the area 24 is provided with substantially vertical manifolds 29 and 31 communicating respectively with the conditioned air supply ducts 15 and 16.

In accordance with one invention aspect, the module receiving area 24 is open through a bottom part thereof to the car interior. From the interior of the car the area 24 receives a module 32 suitably bolted in place and readily accessible for unitary removal. The module 32 has in the illustrated instance a generally rectangular configuration, conforming to that of the receiving area 24. Upper and lower panels 33 and 34, which may be made of or include insulating material, combine with side panels 35 and 36 and an end panel 37 in defining an interior containing, as will hereinafter more clearly appear, components to circulate air and to modify the temperature thereof. That end of the module opposite end panel 37 is open and has installed therein a filter 38. Intermediate its ends, and in side panels 35 and 36 are apertures 39 and 41. In the same side panels and toward the ends thereof are larger openings 42 and 43. In each of the latter is a filter 44. In upper panel 33 is an opening 45. The several defined apertures and openings in the module 32 are selectively located so that in response to a mounting of the module within the receiving area 24, the module apertures and openings are brought inherently to a position of communication with manifolds and openings communicating with space 24. Thus, the forward end of the module, positioning filter 38, is brought to a position of registry with manifold 25 so that return air from the car, filling manifold 25, has freedom of access to the module interior, passing through filter 38. Openings 42 and 43, and the filters 44 therein, are brought inherently to a facing, communicating relation with the screened car apertures 26 and 27 while upper module opening 45 registers and communicates with the car aperture closed by screen 28. Apertures 39 and 41 locate in correspondence with manifolds 29 and 31 and communicate therewith. Air flows pertaining to the ventilating, cooling or heating of the car interior accordingly are through module 32 conveniently located, as noted, in an overhead relation to the car interior and in a fully containing relation to system components.

Figure 4:
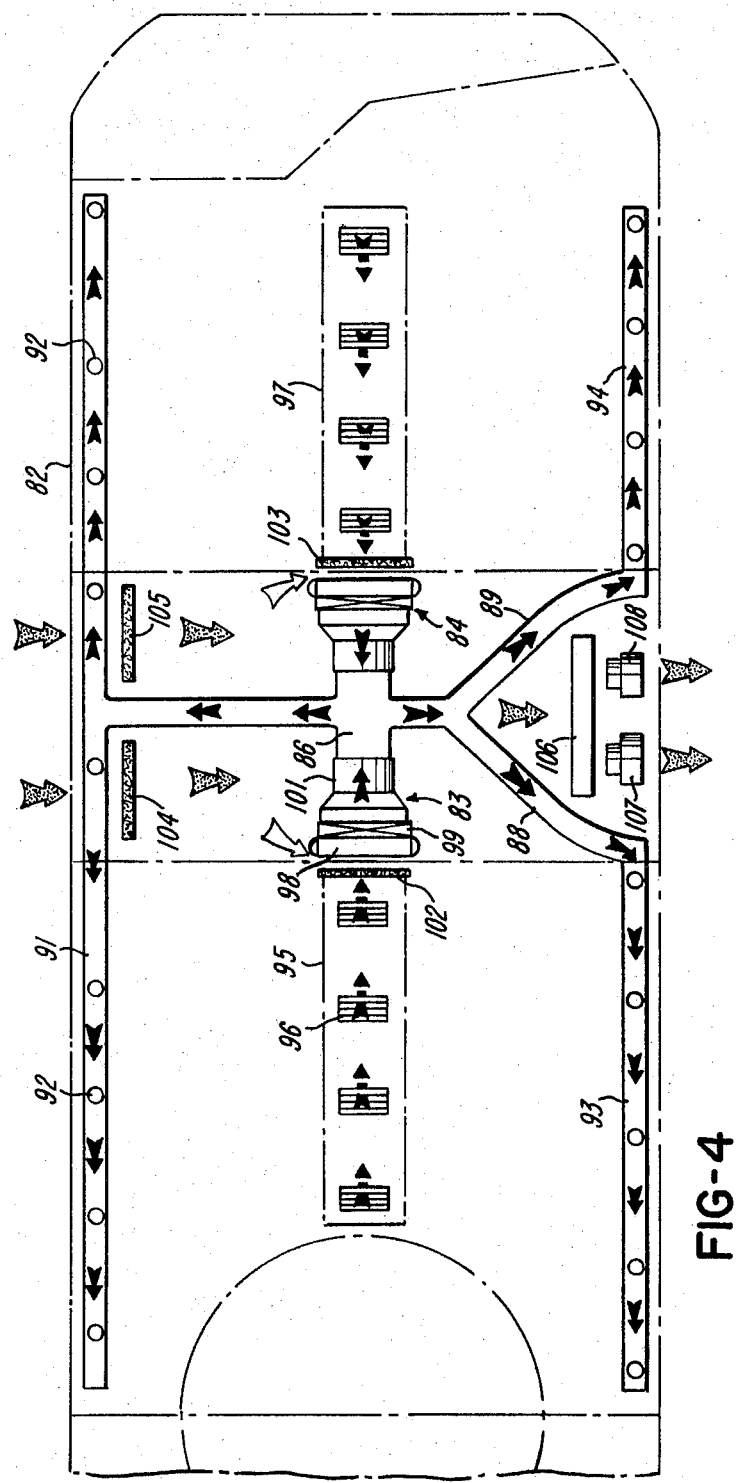
FIG. 4 is a diagram of a control system according to another embodiment of the invention.

The system components include, as shown in FIG. 4, a heat exchanger assembly 46 having evaporator functions and in adjacent spaced relation to the filter 34. Other heat exchanger means 47 having condenser functions locate within the module opposite filtered apertures 42 and 43. Generally intermediate the evaporator and condenser assemblies is a transversely disposed electrically powered motor 49 in a common driving relation to compressors 51 and 52. Positioned adjacent evaporator 46, on the opposite side from filter 34, is a heater 53 which is open for a free flow of air therethrough and which may be comprised of selectively energizable electric resistance heating coils. A manifold 54 is positioned and configured to accept air flowing through evaporator 46 and heater 53. It is connected by a pair of ducts 55 and 56 to another manifold 57 which is in common communication at lateral extremities with the module apertures 39 and 41.

Within the ducts 55 and 56 are vaneaxial fans 58 and 59 oriented to draw air from manifold 54 and force it under pressure to and through manifold 57 to exit from the module by way of apertures 39. Also within the module and disposing intermediately of the condenser assemblies 47 and 48 are other vaneaxial fans 61 and 62 oriented to draw air into the module past screens 26 and 27 and past filters 44 and to compel such incoming air to leave the module by way of the upwardly disposing opening 45 and car screen 28. Also within the module and interconnecting various described components is a refrigerant flowing system, elements of which include a thermostatic expansion valve 63, a filter-drier 64, a liquid quench valve 65 and a hot gas by-pass valve 66. All refrigerant flow lines and valves are internal to the module.

In the air handling system, return air from the car is brought to the front end of the module 32, drawn inwardly past filter 34 and directed through evaporator means 46 and heater 53 to manifold 54. It flows then into manifold 57, out apertures 39 and 41 to manifolds 29 and 31 and the into the conditioned air distribution system including ducts 15 and 16. In a cooling operational mode the return air is cooled in the evaporator and circulated under pressure by the fans 58 and 59. In a reheat operational mode both the evaporator 46 and heater 53 are placed in operation, with the air being dehumidified and cooled in the evaporator and then elevated in temperature in the heater 53 to a desired temperature value. In a heating operational mode the air is heated only. In a ventilation mode the air is circulated by the fans 58 and 59 but is neither cooled nor heated.

The refrigeration system, of which evaporator 46 is a part, uses Refrigerant 12, or the like as a working fluid. A subcooled, condensed refrigerant is supplied to line 67 where it passes through the filter drier 64 and expansion valve 63 to enter evaporator 46. Also in line 67 is a solenoid valve 60 and a restricted by-pass 70. Within the evaporator, the refrigerant fluid circulates in heat transfer relation to return air being drawn through the evaporator by fans 58 and 59 with consequent vaporization and cooling effect. After cooling the air in the evaporator, the superheated refrigerant vapor flows by way of a return line 68 and fitting 69 to a pair of lines 71 and 72 leading respectively to the compressors 51 and 52. Here the vapor is compressed by a positive displacement compressor or the like to a pressure equal to condensing pressure plus the high side plumbing pressure losses. Leaving the compressor by way of respective lines 73 and 74 the compressed gas flows to respective condenser means 47 and 48 where it circulates in heat transfer relation to cooling ambient air being drawn across the condensers by the action of vaneaxial fans 61 and 62. The heat of the refrigerant vapor is rejected to the flowing ambient air which in a heated form is discharged overboard through module opening 45 and car screen 28. The refrigerant fluid leaves the condensers in a cooled, substantially liquid form, and is directed by lines 75 and 76 to a fitting 77 from which supply line 67 extends. The refrigerant manifolds and passages act as the receiver. That is, the refrigerant volume can accommodate all the liquid refrigerant displaced from the system during operation over the entire range of ambient temperatures.

The lines 73 and 74 out of the compressors are bridged by a line 78. Another line 79, in which are the quench valve 65 and the hot gas by-pass valve 66, interconnects the bridging line 78 and the supply line out of the condenser means. The hot gas by-pass valve 66 allows the system to operate smoothly during part load conditions when the compressor capacity is excessive. It tends to operate at low suction pressures in order to reduce the refrigerant boiling temperature and produce the evaporator temperature difference necessary for heat transfer. When the suction pressure is reduced below the set point of the hot gas by-pass valve, the valve opens and hot gas is injected into the compressor suction line. This provides an artificial load to the compressor, since some of the system refrigeration effect is consumed by quenching the hot gas. This parasitic load maintains the evaporator at higher pressures and temperatures, minimizing compressor cycling and delivery temperature excursions. Also it prevents frost formation on and consequent blocking of the air passages of the evaporator. The hot gas flowing from the compressor outlet to the compressor inlet via the hot gas bypass valve is quenched by the liquid quench valve. This valve is a thermostatic expansion valve, whose sensor may be located on the compressor suction line. The arrangement is one to prevent the suction pressure from falling too low and reducing the delivered capacity of the system. The system may further include high and low pressure cutout switches, service valves and various other protective and conventional elements of a refrigerant system.

With further regard to the air handling system, it will be understood that about 50 percent of the conditioned air supplied to the car escapes from the passenger compartment through air leaks and vents in the car body. The balance of the air returns to the environmental module 32 through the overhead ducts. The return air flows through the filter 34 and into a space 81 separating the filter and the face of evaporator 46. Within space 81, the air distributes itself over the face of the evaporator and is drawn therethrough by the action of fans 58 and 59. Makeup air, supplying the balance of the air required to be returned to the car is drawn from ambient surroundings. In accordance with an instant invention aspect, such makeup air is drawn from the module interior from a location intermediate the condenser air filters 45 and the condenser means 47 and 48. Thus, and as indicated in FIG. 4, a portion of the air drawn into the module through apertures 42 and 43, after passing through filters 44, is diverted forwardly in the module and by-passes manifolds 57 and 54 and heater 53 and evaporator 46 to reach space 81 where it mixes with return air from the car to supply the volume of air calculated to be supplied by the fans 58 and 59. The condenser fans 61 and 62 draw air into the module through the air filters 44. Because of the filter pressure drop, the module cavity is at a subatmospheric pressure. The return air duct system is in turn designed so that its pressure drop, when 50 to 60 percent of the compartment airflow is returned, is compatible with the outside air filter pressure drop during air conditioning or cooling mode. The mixture of return air and fresh air flows through the evaporator, where it is cooled and dehumidified. The evaporator, is designed for a face velocity allowing complete collection of condensate in a drain pan (not shown) located in the bottom of the evaporator outlet duct. Such drain pan may be a base pan effectively closing the bottom of the module and adapted to be suitably drained. Rainwater, condensate, wash water and other liquids can collect therein and be drained away.

During heating or ventilation mode of operation, when the refrigeration system is shut off, the condenser fans are inoperative and the internal air pressure of the module is essentially ambient. The evaporator fans under these conditions do not have to produce the additional head required to overcome the head of the condenser fans. This increases the delivered air flow about 30 percent. During operation at this condition, essentially all fresh air is being circulated.

A fully proportional control system, using thermostats and anticipators as sensors, is contemplated in connection with the system as disclosed. A control console may be located in the operator's compartment having a temperature selector allowing warmer or cooler settings, as well as a switch for selection of any of the described full or partial air conditioning modes, ventilation and low and high heat. In these operations, full air conditioning is accomplished by energizing the air conditioning system, accomplishing temperature control by cycling a liquid line solenoid valve. In a partial air conditioning mode, the air conditioning system is energized and temperature control is accomplished by cycling the heater 54 in response to a passenger compartment air temperature signal. In a ventilation mode, the evaporator fans are operated, and all other circuits are deenergized. In a low heat mode, the heater 53 is activated, in conjunction with operation of the evaporator fans 58 and 59, and some supplemental heat within the car may be supplied. In a high heat mode, all stages of supplemental floor heating are turned on and temperature control is achieved by cycling the heater 53. A solenoid valve 60 may be used to interrupt refrigerant flow to the evaporator in reheat and low cool or no cool operational modes. By-pass 70 will in a closed condition of the valve 60 allow some flow to the evaporator so that dehumidification may continue even with the valve closed. The restricted bypass can, if desired, be incorporated directly into the valve.

The invention lends itself to other modular environmental control concepts, as for example the one shown in FIG. 4. Here a car 82 is supplied by back to back environmental control systems 83 and 84 mounted in a module receiving area 85 at an intermediate car location and in an overhead relation to the passenger compartment. According to this concept a conditioned air plenum chamber 86 directs air through passages 87, 88 and 89 leading to delivery ducts 91-94 in which are individual discharge outlets 92. A ceiling return duct 95 having individual inlet registers 96 therein communicates with module receiving area 85 at a location of alignment with control unit 83. A like duct 97 communicates with area 85 at a location of alignment with unit 84. Each environmental control unit includes an evaporator 98, a heater 99, a fan 101 and suitable manifolding means joining the unit to plenum chamber 86. In advance of and in spaced relation to the evaporator of unit 83 is a filter 102, a like filter 103 disposing in advance of and in spaced relation to the evaporator of unit 84.

Module receiving area 83 opens through its sides to ambient surroundings, the car having screened apertures at registering locations corresponding approximately to the screened means 26 and 27 of the first embodiment. At what may be regarded as the inlet side of the module receiving area are filter means 104 and 105. Adjacent the opposite end and in advance of the screened aperture on that side of the car is condenser means 106 and fans 107 and 108.

The operation of the system of FIG. 5 is substantially the same as that of the system of FIG. 4. A refrigerant fluid is circulated in an appropriate manner and under suitable controls between the evaporators 98 and the condenser 106 while fans 101 circulate the conditioned air and fans 107 and 108 draw ambient cooling air through the module receiving area. It will be observed, in this connection that filtered air in the area 85 has access to a space between the filter 102 and its evaporator 98 and between the filter 103 and its evaporator 98 for makeup purposes or to replenish the conditioned air lost by normal means from the passenger compartment.

In either or both disclosed modules there may be provided, as an integral part thereof, spray means for cleaning of the air filter. Thus, and as seen in the first considered embodiment, spray devices 109 position in the space between the air filter and condenser arranged to discharge to and through the filter in a direction opposite to ambient air flow. A permanent connector 111 is installed in the module to have an inlet end opening through a wall of the module housing. In servicing the module, a flexible hose line or the like is attached to connector 111 and opened to a source of water or other fluid under pressure. The spray from devices 109 discharges upon the facing filters with cleaning effect. Air filters of an electrostatic type can be cleaned by lightly spraying the inlet face. In the case of a use of filters of this type devices 109 or their equivalents would be arranged not for reverse flushing as in the illustrated embodiment but for direct discharge upon inlet faces of the filters.

The invention has been disclosed with respect to particular embodiments. Structural modifications have been discovered and these and others obvious to a person skilled in the art to which this invention relates are considered to be within the intent and scope of the invention.

What is claimed:

1. A modular environmental control system in a light weight rail vehicle or the like, said vehicle providing integrated delivery and return flow ducting systems for conditioned air, said ducting systems terminating at their one ends in a module receiving area conveniently accessible at a location above the vehicle floor, said area communicating with the vehicle exterior through openings providing for inflow and outflow of cooling ambient air, at least a portion of said control system being contained in a module installed in and removed from the module receiving area of the vehicle as a self-contained unit, said control system portion comprising refrigeration components including evaporator and condenser fan means to induce air movement through said module receiving area respectively by way of said delivery and return flow ducting systems and said exteriorly communicating openings, said refrigeration components further including evaporator and condenser means respectively and inherently positioned by the unitary installation of said module in said module receiving area to be in the path of flow of said induced air movements.

2. A modular environmental control system according to claim 1, wherein said refrigeration components further include interconnecting refrigerant flow lines, said refrigeration components including said flow lines being fuly contained in a housing defining said module and appropriately apertured for inflow and outflow of the induced air movements.

3. A modular environmental control system according to claim 2, characterized by filter means installed in advance of said evaporator and condenser components.

4. A modular environmental control system according to claim 3, characterized by a liquid flow connection installed in said module and arranged to discharge through the filter means in advance of said condenser means in a direction opposite to the direction of air movement therethrough for filter cleaning.

5. A modular environmental control system according to claim 1, wherein the openings providing for inflow and outflow of cooling ambient air include at least one inflow opening so disposing with reference to the direction of vehicle travel as to be not impacted by air flowing over the vehicle.

6. A modular environmental control system according to claim 2, wherein said housing defines with said vehicle in said module receiving area a manifold chamber receiving return air from the return flow ducting system, an apertured portion of said housing having said evaporator means installed to have air from said manifold chamber moved therethrough.

7. A modular environmental control system according to claim 6, wherein said housing defines an interior chamber through which cooling ambient air moves, apertured portions of said housing registering with externally communicating openings in the vehicle, said externally communicating openings being in planes approximately perpendicular to the vehicle.

8. A modular environmental control system according to claim 7, wherein said interior chamber is in communication with said manifold chamber to supply makeup air to the return flow through said evaporator.

9. A modular environmental control system according to claim 8, wherein said condenser fan means is installed in said interior chamber.

10. A modular environmental control system according to claim 1, characterized by filter means in advance of and in spaced relation to said condenser means, the space between said filter means and said condenser means being in communication with a portion of the return flow ducting system at a location in advance of said evaporator means to supply makeup air.

* * * * *